(12) United States Patent
Rivard

(10) Patent No.: US 12,043,161 B2
(45) Date of Patent: Jul. 23, 2024

(54) OPERATIONAL ASSEMBLY OF A HYDROCLEANER COMPRISING TWO OPERATIONAL MODULES AND TWO SUBFRAMES ADAPTABLE TO DIFFERENT CARRIER VEHICLE FRAMES

(71) Applicant: ORTEC EXPANSION, Aix-en-Provence (FR)

(72) Inventor: Daniel Rivard, Paris (FR)

(73) Assignee: Ortec Expansion, Aix-en-Provence (FR)

( * ) Notice: Subject to any disclaimer, the term of this patent is extended or adjusted under 35 U.S.C. 154(b) by 707 days.

(21) Appl. No.: 17/200,091

(22) Filed: Mar. 12, 2021

(65) Prior Publication Data

US 2021/0284058 A1 Sep. 16, 2021

(30) Foreign Application Priority Data

Mar. 14, 2020 (FR) ...................................... 2002528

(51) Int. Cl.
*B60P 3/22* (2006.01)
*E01H 3/02* (2006.01)

(52) U.S. Cl.
CPC ................ *B60P 3/221* (2013.01); *E01H 3/02* (2013.01)

(58) Field of Classification Search
CPC .................................. B60P 3/221; E01H 3/02
See application file for complete search history.

(56) References Cited

U.S. PATENT DOCUMENTS

| 3,317,049 A * | 5/1967 | Petretti | ................... | E03F 7/106 |
| | | | | 414/469 |
| 3,421,646 A | 1/1969 | Rouse et al. | | |
| 3,570,526 A * | 3/1971 | Fisco, Jr. | .................. | E03F 7/10 |
| | | | | 137/340 |
| 3,720,226 A * | 3/1973 | Minich | ..................... | B60S 3/04 |
| | | | | 239/130 |

(Continued)

FOREIGN PATENT DOCUMENTS

| DE | 821176 C | 11/1951 |
| DE | 29901936 U1 | 4/1999 |

(Continued)

OTHER PUBLICATIONS

French Search Report for FR Application No. 2002528 dated Nov. 12, 2020 (2 pages).

*Primary Examiner* — Kevin Hurley
*Assistant Examiner* — Michael R Stabley
(74) *Attorney, Agent, or Firm* — Alston & Bird LLP

(57) ABSTRACT

The hydrocleaner may include a carrier vehicle provided with a frame, as well as an operational assembly which may be removably fixed on the frame of the carrier vehicle. The operational assembly may include two operational modules which may have all the operational equipment, including a first operational module provided with at least one tank and a second operational module provided with at least one pumping system, as well as two subframes. Each of the operational modules may be capable of being fixed on one of these subframes. Each of these subframes may be adaptable to different carrier vehicle frames and may be adapted to the frame of the carrier vehicle on which it is intended to be mounted, which may allow a rapid fitting and a rapid removal of the operational assembly.

10 Claims, 5 Drawing Sheets

(56) References Cited

U.S. PATENT DOCUMENTS

| | | | | |
|---|---|---|---|---|
| 3,958,594 A * | 5/1976 | Masters | ................. | B65H 75/38 |
| | | | | 137/355.12 |
| 4,234,980 A * | 11/1980 | DiVito | ..................... | E03F 7/10 |
| | | | | 15/340.1 |
| 5,312,551 A * | 5/1994 | Perron | ..................... | C02F 1/52 |
| | | | | 210/392 |
| 7,624,885 B2 * | 12/2009 | Pfau | ................... | B65D 88/022 |
| | | | | 220/4.28 |
| 9,505,583 B1 * | 11/2016 | Hellbusch | ............ | B65H 75/425 |
| 9,611,636 B2 * | 4/2017 | Hetcher | .................... | E03F 7/10 |
| 10,071,670 B2 * | 9/2018 | Mayer | ................ | B65H 75/425 |
| 10,087,613 B2 * | 10/2018 | Hetcher | ................ | B01D 29/56 |
| 10,518,690 B2 * | 12/2019 | Haut | ................... | B60P 3/2215 |

FOREIGN PATENT DOCUMENTS

| | | | |
|---|---|---|---|
| FR | 3055130 | A1 | 2/2018 |
| FR | 3068656 | A1 | 1/2019 |

\* cited by examiner

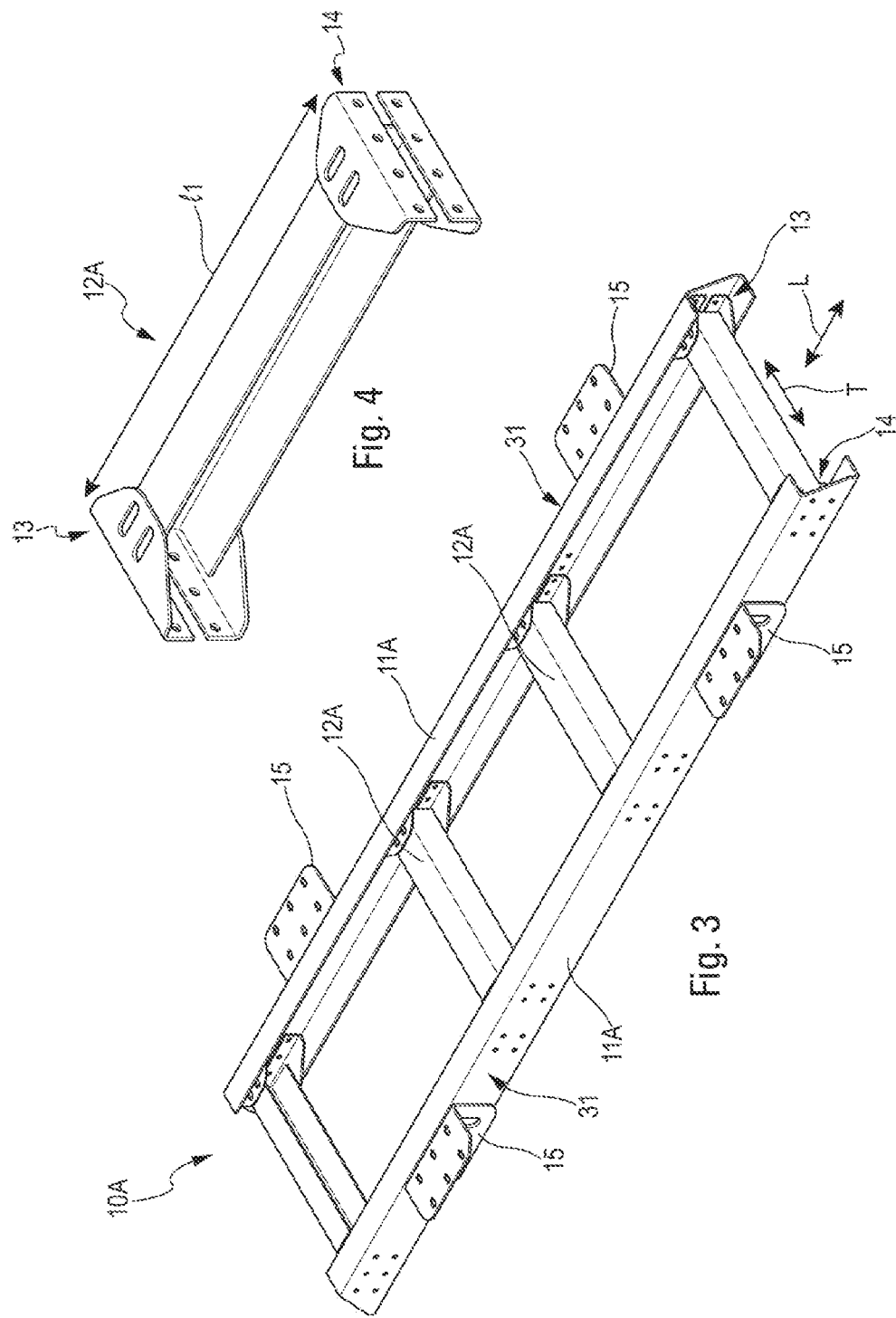

OPERATIONAL ASSEMBLY OF A HYDROCLEANER COMPRISING TWO OPERATIONAL MODULES AND TWO SUBFRAMES ADAPTABLE TO DIFFERENT CARRIER VEHICLE FRAMES

CROSS-REFERENCE TO RELATED APPLICATIONS

This application claims priority to French Application No. 2002528, entitled "Ensemble fonctionnel d'un hydrocureur comportant deux modules fonctionnels et deux faux-châssis adaptables à des châssis différents de véhicules porteurs" and filed Mar. 14, 2020, which application is incorporated by reference herein in its entirety.

TECHNICAL FIELD

The present invention relates to an operational assembly of a hydrocleaner intended to be mounted on a carrier vehicle, and a hydrocleaner provided with such an operational assembly.

STATE OF THE ART

More specifically, although not exclusively, the present invention is applied to an industrial hydrocleaner. It can also be applied to a sanitation hydrocleaner which is intended, in particular, to ensure dredging and pumping operations of wastewater networks and sanitation works.

It is known that an industrial hydrocleaner is intended for works for cleaning industrial equipment and installations. In particular, an industrial hydrocleaner is used during pumping and cleaning works on oil and oil-related sites. A hydrocleaner used in oil and oil-related facilities has, in particular, functions of:
  pumping oil products; and
  carrying out high-pressure various works (scouring, unplugging, repairing exchanger tubes, cleaning enclosures or containers, etc.).

To do this, the hydrocleaner comprises a set of operational equipment (collection tank, pumping system, etc.) allowing to carry out pumping and cleaning operations. These items of operational equipment are mounted on a carrier vehicle such as a truck. Generally, the operational equipment of the hydrocleaner have a significant service life, for example or the order of twenty years, which is, generally, a lot greater than the (good) operating duration without breakdown of the carrier vehicle, often less than ten years.

Also, after ten years of operation, the operator of such an industrial hydrocleaner is confronted with the following dilemma:
  either keeping the hydrocleaner for a lot longer (beyond this duration) with increasing maintenance and/or repair costs for the carrier vehicle, as well as increasing downtime durations, in particular for maintenance and/or repair operations;
  or replacing the hydrocleaner with a new hydrocleaner to have a new carrier vehicle, while knowing that the operational equipment also operate correctly and would have been able to continue to be used.

Each of these two solutions is expensive, and none of these are actually satisfactory.

To this are added environmental constraints. In particular, the standards on the exhaust gas releases of the vehicles are evolving very quickly, and because of this, reduce the service life of the carrier vehicles or also reduce the places where the hydrocleaners can be operated.

SUMMARY OF THE INVENTION

The present invention relates to an operational assembly of a hydrocleaner intended to be mounted on a carrier vehicle provided with a frame, which aims to overcome the abovementioned disadvantages, the operational assembly comprising a plurality of operational equipment.

According to the invention, said operational assembly comprises:
  two operational modules integrating all said operational equipment, namely a first operational module provided with at least one tank, and preferably other elements described below, and a second operational module provided with at least one pumping system; and
  two subframes, each of said operational modules being capable of being fixed on one of said subframes, each of said subframes being adaptable to different carrier vehicle frames and being adapted to the frame of the carrier vehicle on which it is intended to be mounted.

Thus, thanks to the invention, it is possible to conserve the operational equipment which are in a good operating condition and to replace the carrier vehicle, by mounting the operational assembly on another carrier vehicle, in particular a new carrier vehicle, via the two subframes which can be adapted to the new carrier vehicle.

During the change of carrier vehicle or during the first installation on a carrier vehicle, each of the two subframes which is therefore adaptable to different frames (and thus to different carrier vehicles) is adjusted or done to be adapted to the frame of the carrier vehicle used.

The operational assembly also has other advantages specified below.

In a preferred embodiment, each of said subframes is adaptable by width.

Advantageously, each of said subframes comprises longitudinal members and crossmembers, the crossmembers having a length adapted to the width of the frame of the carrier vehicle. To do this, in a particular embodiment, at least some of said crossmembers are telescopic, which allows to conserve the same crossmembers to modify the width of the subframe(s).

Moreover, advantageously, at least some of said crossmembers are curved to create a passage under the curve, in particular to allow the passage of pipes and/or connecting cables. This curve can be produced upwards or downwards.

Advantageously, each of the subframes has a limited number of fixing points (or zones), preferably four fixing points, intended for its removable fixing to the frame of the carrier vehicle. By this limited number of fixing points, as well as by the features specified below of these fixing points, it is possible to produce a facilitated and rapid fitting and/or removal of the operational assembly on the frame of the carrier, which allows to reduce the downtime duration of the hydrocleaner and the fitting and/or removal costs.

Moreover, advantageously, the first module is provided, in addition to the tank (preferably a tank for collecting, in particular, pumped products), with at least some of the following elements:
  water tanks;
  cyclonic tanks and pumps;
  storage boxes; and accessories (or equipment), necessary and/or useful for the implementation of the hydrocleaner, such as a high-pressure winder, a pumping winder and/or command and control systems.

Furthermore, advantageously, the second module comprises a closed box wherein is installed, in addition to the pumping system, at least one high-pressure system and one filtering system.

The present invention also relates to a hydrocleaner which comprises a carrier vehicle provided with a frame, as well as an operational assembly such as that described above, which is removably fixed on said frame of the carrier vehicle.

Advantageously, each of the subframes is removably fixed on the frame at fixing points, preferably four fixing points, each of the fixing points comprising a first support element integral with the subframe which is removably fixed, for example using a bolt, on a second support element integral with the frame.

In a particular embodiment, the frame of the carrier vehicle has a variable width and, in this case, each of the subframes is adapted to the width of the portion of the frame on which it is fixed.

BRIEF DESCRIPTION OF THE FIGURES

The appended figures will make it well understood, how the invention can be achieved. In these figures, identical references designate similar elements.

FIG. 3 is a perspective view of an example of a subframe.

FIG. 4 is a perspective view of a crossmember of the subframe of FIG. 3.

DETAILED DESCRIPTION

Figure 1:
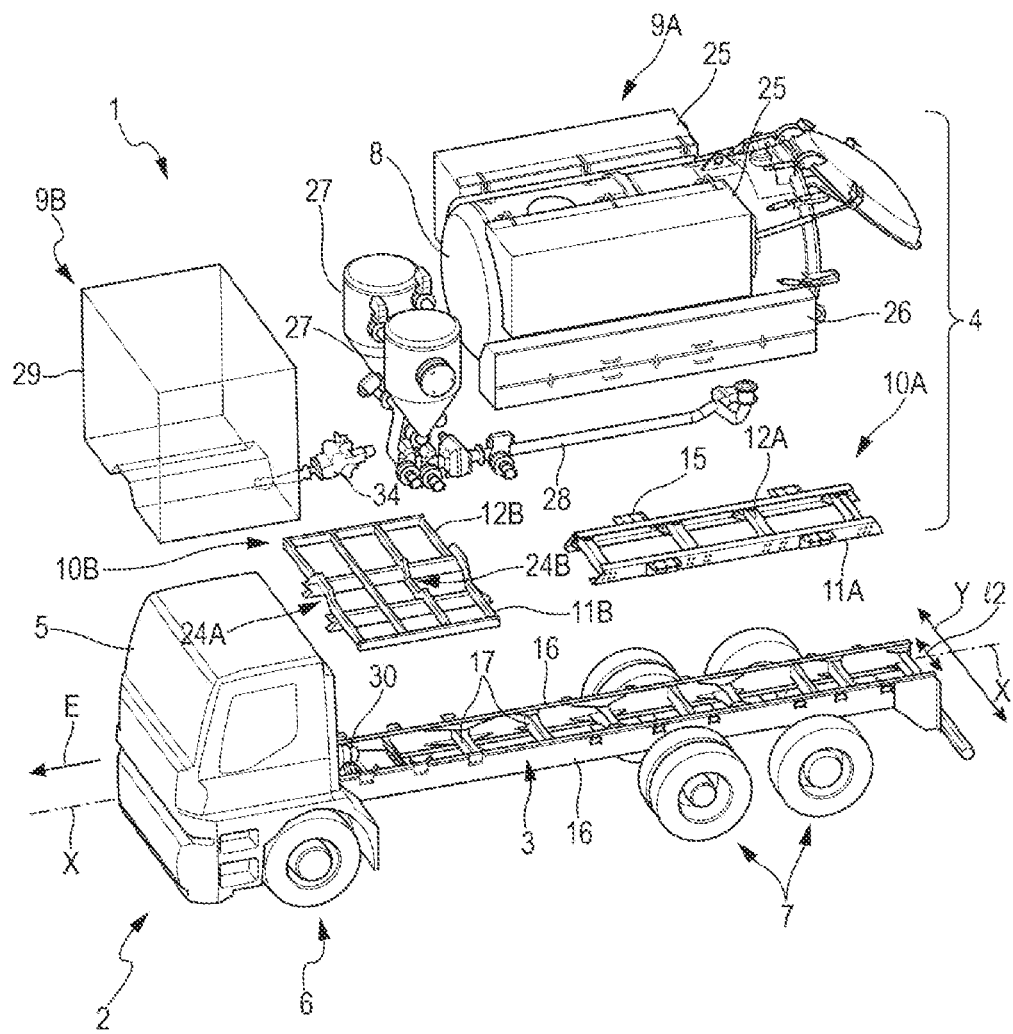
FIG. 1 is an exploded, schematic view of a particular embodiment of a hydrocleaner.
Figure 2:
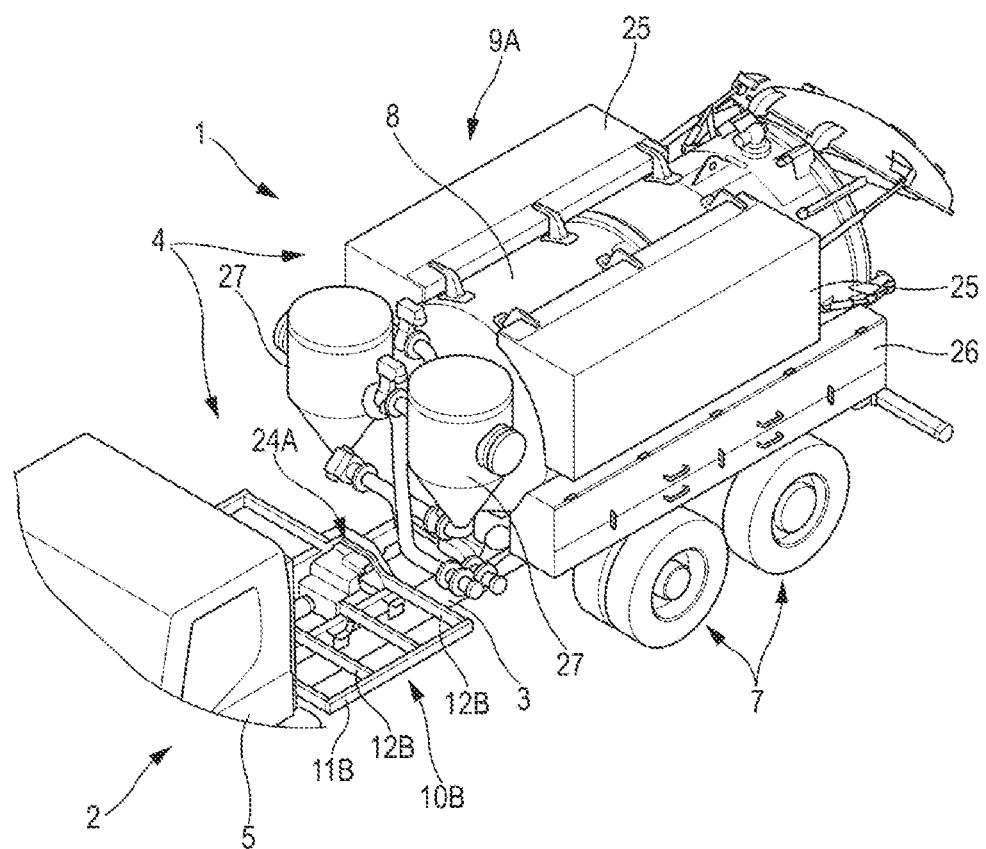
FIG. 2 is a schematic, perspective view, of a portion of the hydrocleaner of FIG. 1.

A hydrocleaner 1 illustrating the invention is represented in a particular embodiment in FIGS. 1 and 2.

In a preferred application, the hydrocleaner 1 is an industrial hydrocleaner which is intended for works for cleaning industrial equipment and installations, and in particular pumping and cleaning works on oil and oil-related sites.

The hydrocleaner 1 comprises a carrier vehicle 2 provided with a frame 3 of longitudinal axis X-X (FIG. 1), and an operational assembly 4 which is intended to be (removably) fixed on said frame 3 of the carrier vehicle 2, as specified below.

The carrier vehicle 2 is a truck, namely a land vehicle intended for the transport, which is equipped, usually, in particular, with a cabin 5 (for a driver), a steering axle 6, carrying axles 7 and the frame 3.

The operational assembly 4 comprises, itself, represented in FIG. 1, two operational modules 9A and 9B. By "operational" module (or equipment or assembly), this means the fact that the module (or equipment of assembly) comprises means allowing to implement particular functions (or tasks or operations) of the hydrocleaner 1 such as a pumping of industrial products, for example.

The operational modules 9A and 9B integrate all the operational equipment of the hydrocleaner 1. In particular, the operational module 9A is in particular provided with a collection tank 8, for example made of stainless steel, as well as other equipment specified below, and the operational module 9B is provided with a pumping system, as well as other equipment also specified below. The operational module 9B comprises a closed box 29, for example made of stainless steel, wherein equipment of this operational module 9B is installed, which are not represented in FIG. 1.

The operational assembly 4 also comprises two subframes 10A and 10B. The operational module 9A is configured to be able to be (removably) fixed on the subframe 10A and the operational module 9B is configured to be able to be (removably) fixed on the subframe 10B.

Each of the subframes 10A and 10B can be removably fixed on the frame 3. By "removably fixed", this means the fact of being able to connect in a sufficiently solid and stable manner for the use considered, for example by means of a bolt, this connection being able to be removed to release the connected element.

Each of the two subframes 10A and 10B is adaptable to different frames 3 of a carrier vehicle, i.e. that it can be modified, in particular by width, to be able to be adapted, i.e. to be installed and fixed on the particular frame of any carrier vehicle, in the manner described below. In a particular embodiment (not represented), when the frame of the carrier vehicle has a variable width, each of the two subframes is adapted to the width of the portion of the frame, on which it must be fixed.

The operational assembly 4 is adapted to the frame 3 of the carrier vehicle 2 on which it is intended to be mounted. Consequently, the operational assembly 4 can be mounted on carrier vehicles provided with different frames, by adapting, each time, the two subframes 10A and 10B to the frame 3 of the carrier vehicle 2 used. The only adaptation necessary for the operational assembly 4 therefore relates to the adaptation of the subframes 10A and 10B.

In FIG. 1, an arrow E directed to the front of the carrier vehicle 2 (and therefore the hydrocleaner 1) has been represented, the rear being directed in the opposite direction. The operational module 9A is arranged via the subframe 10A to the rear of the frame 3, and the operational module 9B is arranged via the subframe 10B to the front of the frame 3, in front of the operational module 9B.

The two subframes 10A and 10B are therefore mounted on the single frame 3 of the carrier vehicle 2, the subframe 10A being arranged to the rear of the carrier vehicle 2 and the subframe 10B being arranged to the front, between said subframe 10A and the cabin 5 of the carrier vehicle 2.

The operational assembly 4 can therefore be transposed from a frame of a carrier vehicle to another frame of another carrier vehicle, thanks to the modular equipment (namely the two operational modules 9A and 9B) associated with intermediate parts (namely the two subframes 10A and 10B) adaptable to the different frames.

Thus, it is in particular possible to conserve the operational equipment which are also in a good operating condition and to replace the carrier vehicle 2, by mounting the operational assembly 4 on another carrier vehicle, in particular new, via the two subframes 10A and 10B which can be adapted to the frame of the new carrier vehicle. The replacement of carrier vehicle can also be done to satisfy new regulatory constraints, and in particular environmental. The operational assembly 4 and the hydrocleaner 1 have other advantages specified below.

In a preferred embodiment, each of the subframes 10A and 10B is adaptable by width.

In addition, in a preferred embodiment, each of the subframes 10A and 10B comprises two longitudinal members 11A and 11B and crossmembers 12A and 12B fixed to these longitudinal members 11A and 11B, as represented for the subframe 10A in FIG. 3. The crossmembers 12A have a width 11 (FIG. 4) adapted to the width 12 (FIG. 1) of the frame 3 of the carrier vehicle 2.

The crossmembers 12A, 12B of the subframe 10A, 10B, of which a particular example of the crossmember 12A is represented in FIG. 4, are arranged along a transversal direction illustrated by a double arrow T in FIG. 3, and the longitudinal members 11A, 11B of the subframe 10A, 10B are arranged along a longitudinal direction illustrated by a double L.

The subframe 10A (of FIG. 3) is mounted on the frame 3 with its longitudinal direction L parallel to the longitudinal axis X-X (FIG. 1) of the frame 3 and with its transversal direction T parallel to the transversal direction Y (FIG. 1) of the frame 3.

To do this, crossmembers 12A of suitable length 11 are used. In a variant of an embodiment (not represented), crossmembers can also be used which are telescopic in the direction of the length 11, which allows to use the same crossmembers for subframes of different widths.

In the example of FIG. 3, the longitudinal members 11A have a U-shaped transversal cross-section with flat faces. The U-shaped openings of the two longitudinal members 11A are arranged facing one another and receive respectively the ends 13 and 14 of the crossmembers 12A (FIG. 4) which are fixed, in particular using bolts, to said longitudinal members 11A. In the example of FIG. 3, the subframe 10A is provided with four crossmembers 12A.

In addition, the subframe 10A comprises four mounting brackets 15 which are arranged, on each side, frontwards and rearwards. The mounting brackets 15 are fixed, for example welded or screwed, on the outer face 31 of the longitudinal members 11A by projecting outwards. The mounting brackets 15 are intended to receive the operational modules 9A and 9B which are removably fixed on these mounting brackets 15 using engaging means. In a particular embodiment, a limited number of fixing points are provided, preferably four fixing points as in the example of FIG. 3.

The frame 3 of the carrier vehicle 2 comprises, itself, usually, in particular two longitudinal members 16 (parallel to the axis X-X) and a plurality of crossmembers 17 transversally fixed (along the direction Y) to these two longitudinal members 16.

In a particular embodiment, for the fixing of each of the subframes 10A and 10B on the frame 3, a limited number of fixing 32 is provided, i.e. points (or zones) where the subframe 10A, 10B is removably fixed on the frame 3. Preferably, four fixing points 32 are provided, namely on each side, a fixing point to the front and the fixing point to the rear of the subframe considered.

In the example of a fixing represented in FIGS. 5 to 10, at each fixing point (or zone) 32, the longitudinal member 16 is provided with a support element on its outer face 33. In the example of these FIGS. 5 to 10, the longitudinal member 16 has a U-shape with flat faces of which the opening is oriented inwards.

Figure 5:
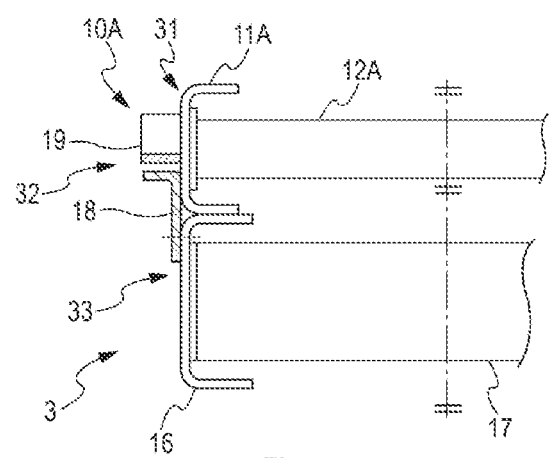
FIG. 5 is a partial, transversally cross-sectional schematic view, illustrating a first embodiment of a fixing point of a subframe on a frame of a carrier vehicle.
Figure 6:
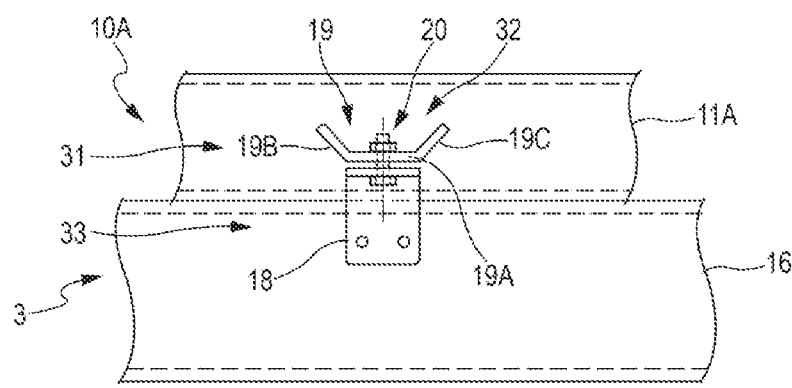
FIG. 6 is a lateral, schematic and partial view of the first embodiment of FIG. 5.
Figure 7:
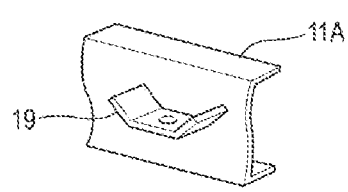
FIG. 7 is a partial, perspective view of a support element of the first embodiment of FIGS. 5 and 6.

In addition, in a first embodiment represented in FIGS. 5 to 7, the support element is a mounting bracket 18 fixed on the outer face 33, which exceeds the longitudinal member 16 of the frame 3 upwards, to be able to serve to transversally support the longitudinal member 11A of the subframe 10A which rests on the longitudinal member 16.

The longitudinal member 11A is also provided with a support element 19 which is fixed on the outer face 31 of said longitudinal member 11A. The support element 19 is removably fixed on the mounting bracket 18 by way of a bolt 20 (provided with a screw and a nut). The support element 19 comprises a central branch 19A and lateral branches 19B and 19C spread out, as represented in FIG. 7.

Figure 8:
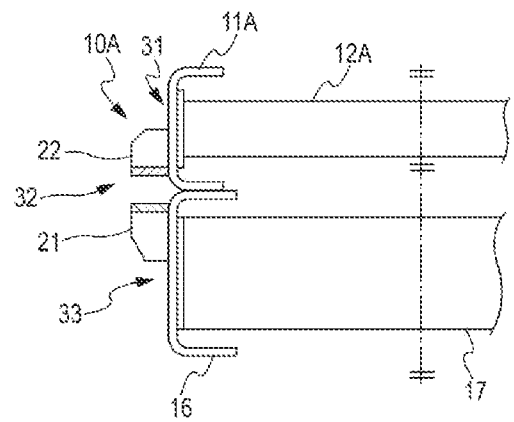
FIG. 8 is a partial, transversally cross-sectional schematic view, illustrating a second embodiment of a fixing point of a subframe on a frame of a carrier vehicle.
Figure 9:
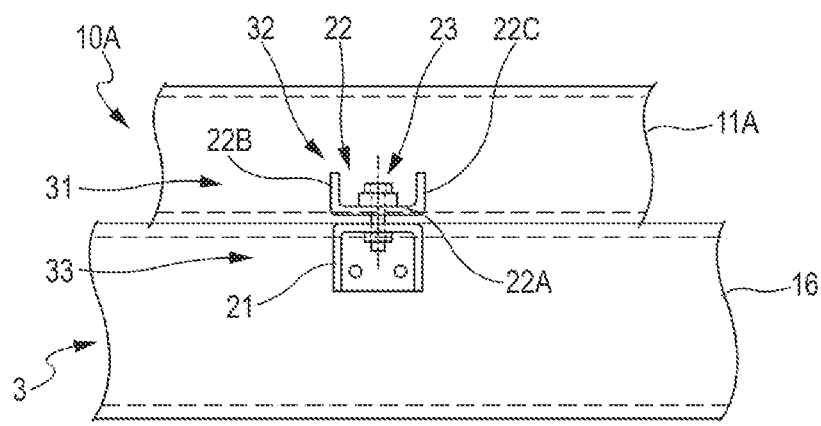
FIG. 9 is a lateral, schematic and partial view of the second embodiment of FIG. 8.
Figure 10:
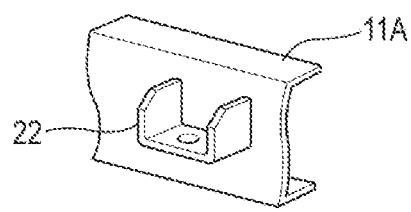
FIG. 10 is a partial, perspective view of a support element of the second embodiment of FIGS. 8 and 9.

In addition, in a second embodiment represented in FIGS. 8 to 10, the support element is an element 21, of "corbel" type, which arrives at the height of the longitudinal member 16 of the frame 3. The longitudinal member 11A of the subframe 10A rests on the longitudinal member 16.

The longitudinal member 11A is also provided with a support element 22, which is fixed on the outer face 31 of the longitudinal member 11A of the subframe 10A. The support element 22 is removably fixed on the support element 21 by way of a bolt 23 (provided with a screw and a nut). The support element 22 comprises a central branch 22A and lateral branches 22B and 22C which are parallel to one another and orthogonal to the central branch 22A, as represented in FIG. 10.

Moreover, in a particular embodiment, some of the crossmembers 12B are curved (or arched), to create a passage below or above the crossmember, as represented in FIGS. 1 and 2 for the subframe 10B.

Such a curve which allows to create a passage under the curve, in particular to allow the passage of pipes and/or connecting cables, can be done upwards or downwards. This curve can be made upwards like the curves 24A (FIGS. 1 and 2) or downwards like the curve 24B (FIG. 1) of the subframe 10B.

Moreover, in a particular embodiment (not represented), a carrier vehicle can be used which comprises a frame, of which the width is not constant over the whole length of said frame. In particular, the frame can comprise, along its longitudinal axis, at least two portions connected to one another and of which each has a constant width, different from the width of the other portion. As an example, the frame of the carrier vehicle can have a width to the front greater than to the rear, due to the different types of axles, with for example an axled single wheel to the front and axled twin wheels to the rear. In such a particular embodiment, each of the two subframes is adapted to the width of the portion of the frame on which it must be fixed. Consequently, the fact of having two subframes and two operational modules allows to adapt the operational assembly to at least two different main widths to the front and to the rear of the frame.

Moreover, the module 9A is provided in the preferred embodiment, represented in FIG. 1, in addition to the collection tank 8, with the following elements:

water tanks 25, arranged on either side of the tank 8 upwards of the tank 8;

storage boxes 26, in particular for the storage of pipes and other accessories, arranged on either side of the tank 8 to the bottom of the tank 8;

cyclonic tanks 27 (and pumps) provided with pipes 28; and various accessories (or equipment), necessary and/or useful for the implementation of the hydrocleaner, such as a high-pressure winder, a pumping winder, command and control systems and/or bumpers.

In a variant of an embodiment (not represented), the module 9A can be provided only with a portion of the preceding elements and/or also comprise other elements.

Furthermore, the module 9B is provided, inside the closed box 29, with a hydraulic motor, preferably high-pressure pumps, a filtering system, etc., as well as a hydraulic pump 34. This module 9B is connected to a usual power take-off 30 of the carrier vehicle 2, for the drive (or the power take-off).

In a variant of an embodiment (not represented), the module 9B can be provided only with some of the preceding elements and/or also comprise other elements.

To mount (or fit) an operational assembly 4, such as that described above, on a carrier vehicle 2, with the aim of obtaining a hydrocleaner 1, it is sufficient mainly to only implement the main following operations:

A1) fitting the subframe 10B on the frame 3, and fix it at the fixing points 32, for example at four fixing points 32;

A2) fitting the subframe 10A on the frame 3, and fixing it at the fixing points 32, for example at four fixing points 32;

A3) fitting the operational module 9B on the subframe 10B and fixing it at the fixing points, for example at four fixing points, and also connecting to the power take-off 30 and possibly carrying out other connections of cables and/or of pipes; and A4) fitting the operational module 9A on the subframe 10A and fixing it at the fixing points, for example at four fixing points.

Steps A1, A2, A3 and A4 can be implemented according to several different developments, by providing to first mount one or the other of the subframes 10A and 10B or one or the other of the operational modules 9A and 9B.

Moreover, to dismount (or remove) an operational assembly 4, such as that described above, of a carrier vehicle 2, it is sufficient, for example, to carry out the preceding operations in the opposite direction, namely:

B1) removing the fixings (at the fixing points) connecting the operational module 9A to the subframe 10A, for example at four fixing points, and removing the operational module 9A from the subframe 10A;

B2) disconnecting the power take-off 30, removing the fixings (at the fixing points) connecting the operational module 9B to the subframe 10B, for example at four fixing points, and removing the operational module 9B from the subframe 10B;

B3) removing the fixings (at the fixing points 32) connecting the subframe 10A to the frame 3, for example at four fixing points, and removing the subframe 10A from the frame 3; and B4) removing the fixings (at the fixing points 32) connecting the subframe 10B to the frame 3, for example at four fixing points, and removing the subframe 10B from the frame 3.

Steps B1, B2, B3 and B4 can be implemented according to several different developments, by providing to first remove one or the other of the operational modules 9A and 9B.

A rapid fitting and/or removal of the operational assembly 4 can thus be carried out, with respect to the frame 3 of the carrier vehicle 4, and this in particular thanks to the following features:

the integration of all the operational equipment in two operational modules 9A and 9B;
the use of adaptable subframes 10A and 10B;
a limited number of fixing points, on the one hand between the operational modules 9A and 9B and the subframes 10A and 10B, and on the other hand between the subframes 10A and 10B and the frame 3; and
the use of rapid fixing means such as bolts.

It will be noted that, in a usual hydrocleaner not having the features of the present invention, the equipment is generally interlocked with one another and pipes and connecting cables are also provided at the level of the frame which causes, without the use of modules and subframes like in the present invention, the time for removing equipment from such a usual hydrocleaner to be a lot longer. This is the same for the fitting time. This requires modifying the assembly of the subframe, making it capable of being mounted on another carrier frame. Such an operation is long and expensive.

Moreover, although this is not the main aim of the invention, it can also be considered that, for a new hydrocleaner, the carrier vehicle is kept, and the operational assembly is replaced, by mounting a new operational assembly on this carrier vehicle, in the manner described above. This situation can be presented, for example, in case of breakdown or failure of one or more items of equipment of the operational assembly. This situation can also be presented when it is sought to replace at least one of the operational modules with another operational module provided with other equipment or equipment of the same type, but having different features.

The operational assembly 4 and the hydrocleaner 1, such as described above, have numerous advantages. In particular:

they allow to achieve and to facilitate the interchangeability of the carrier with respect to the operational assembly, in order to, in particular:
reduce downtime; and
respond to current and/or future environmental constraints of carrier vehicles which is evolving very rapidly, to replace an old carrier vehicle (which no longer responds to these environmental constraints) with a new carrier vehicle which responds, itself, to these environmental constraints; and
the modularity of the operational assembly 4, with the two operational modules 9A and 9B and the two subframes 10A and 10B, allows a rapid removal and a rapid remounting of a frame of a carrier vehicle to another frame of another carrier vehicle; and
the modularity of the operational modules 9A and 9B and of the subframes 10A and 10B can allow a standardised manufacture of these elements.

The invention claimed is:

1. An operational assembly of a hydrocleaner intended to be mounted on a carrier vehicle provided with a frame, the operational assembly comprising a plurality of items of operational equipment, wherein the operational assembly comprises:
two operational modules both comprising said operational equipment, comprising a first operational module provided with at least one tank and a second operational module provided with at least one pumping system; and
two subframes, each of said operational modules being capable of being fixed on one of said subframes, each of said subframes being adaptable to different carrier vehicle frames and being adapted to the frame of the carrier vehicle on which it is intended to be mounted, wherein each of said subframes is adaptable by width.

2. The operational assembly according to claim 1, wherein each of said subframes comprises longitudinal members and crossmembers, the crossmembers having a length adapted to the width of the frame of the carrier vehicle.

3. The operational assembly according to claim 2, wherein at least some of said crossmembers are telescopic.

4. The operational assembly according to claim 2, wherein at least some of said crossmembers are curved to create a passage under the crossmembers that are curved.

5. The operational assembly according to claim 1, wherein each of the subframes has four fixing points intended for its removable fixing to the frame.

6. The operational assembly according to claim 1, wherein the first operational module is provided, in addition to the tank, with at least some of the following elements:
water tanks;
storage boxes;
cyclonic tanks; and
various equipment.

7. The operational assembly according to claim 1, wherein the second operational module comprises a closed box, wherein is installed, in addition to the pumping system, at least one high-pressure system and one filtering system.

8. A hydrocleaner comprising a carrier vehicle provided with a frame, as well as an operational assembly according to claim 1, which is removably fixed on said frame of the carrier vehicle.

9. The hydrocleaner according to claim 8, wherein each of the subframes is removably fixed on the frame at fixing points, each of the fixing points comprising a first support element integral with the subframe which is removably fixed on a second support element integral with the frame.

10. The hydrocleaner according to claim 8, wherein the frame of the carrier vehicle has a variable width and in that each of the subframes is adapted to the width of the portion of the frame on which it is fixed.

* * * * *